July 20, 1954     R. P. TREMPE     2,684,476
FLASHING DANGER LIGHT FOR VEHICLES

Filed Nov. 18, 1950     2 Sheets-Sheet 1

INVENTOR.
Robert P. Trempe
BY Robert M. Dunning
ATTORNEY

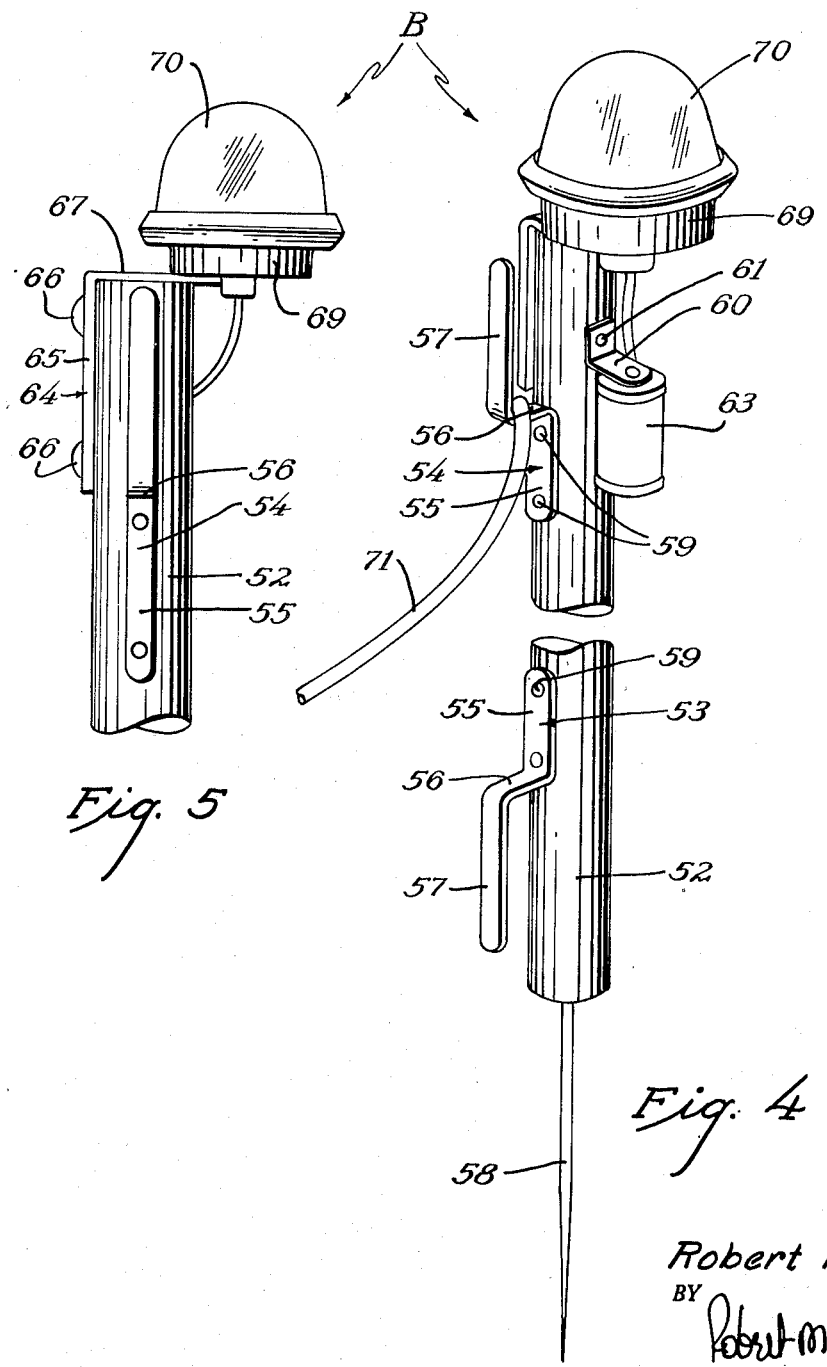

Patented July 20, 1954

2,684,476

UNITED STATES PATENT OFFICE 2,684,476

FLASHING DANGER LIGHT FOR VEHICLES

Robert P. Trempe, St. Paul, Minn.

Application November 18, 1950, Serial No. 196,368

6 Claims. (Cl. 340—366)

The present invention relates to an improvement in danger light and deals particularly with a signal light useful in conjunction with vehicles to provide a signal that the vehicle is stalled on or along side of the highway.

When a truck stops upon a highway, the driver is required to maintain signal lights both behind and in front of the vehicle to provide a warning signal. In many instances the signal comprises a flare which burns for a fixed length of time. Such a signal requires attention from time to time as a new flare must be ignited when the old one burns out. This prevents the driver from giving full attention to making repairs or accomplishing the task requiring the stopping of the vehicle. Thus a signal light which remains in operation throughout the entire length of time the vehicle is stopped, without further attention is of considerable advantage.

An object of the present invention lies in the provision of a simple and effective device which may be attached to the current supply of the vehicle and which may be used to provide a danger signal. This device is preferably enclosed when not in use and when opened forms a signal light which may be seen from a substantial distance.

A feature of the present invention lies in the provision of a signal which may be plugged into the opening normally provided for a cigarette lighter on the vehicle. By merely removing the cigarette lighter and plugging in a suitable plug, the signal light may be quickly ready for operation.

A further feature of the present invention lies in the provision of a signal which flashes so as to provide an intermittent flashing signal. This type of signal has been often used as a warning signal and is therefore particularly useful in the present combination.

An added feature of the preferred form of the invention lies in the fact that the wiring and the terminal connections are completely enclosed in a casing when not in use. The casing forms a standard for the signal when the signal is in use. Thus the device may be conveniently stored when not in use.

An added feature of the present invention lies in the fact that a trouble light may be used in conjunction with the signal light. It is often desirable to illuminate parts of the vehicle during repair thereof. A trouble light is thus provided which may be used simultaneously with a signal light and which may provide the necessary illumination for making repairs at night.

A feature of the modified form of the invention resides in the provision of a standard which may be inserted into the ground and which serves as a support for the wire. The wire may be quickly unreeled from the standard and attached to the source of light, thereby quickly providing a danger signal on the highway.

These and other objects and novel features of my invention will be more clearly and fully set forth in the following specification and claims.

In the drawings forming a part of my specification:

Figure 4 is a perspective view of a modified form of construction of the invention.

Figure 5 is an elevation view showing the upper portion of the structure illustrated in Figure 4.

Figure 1:
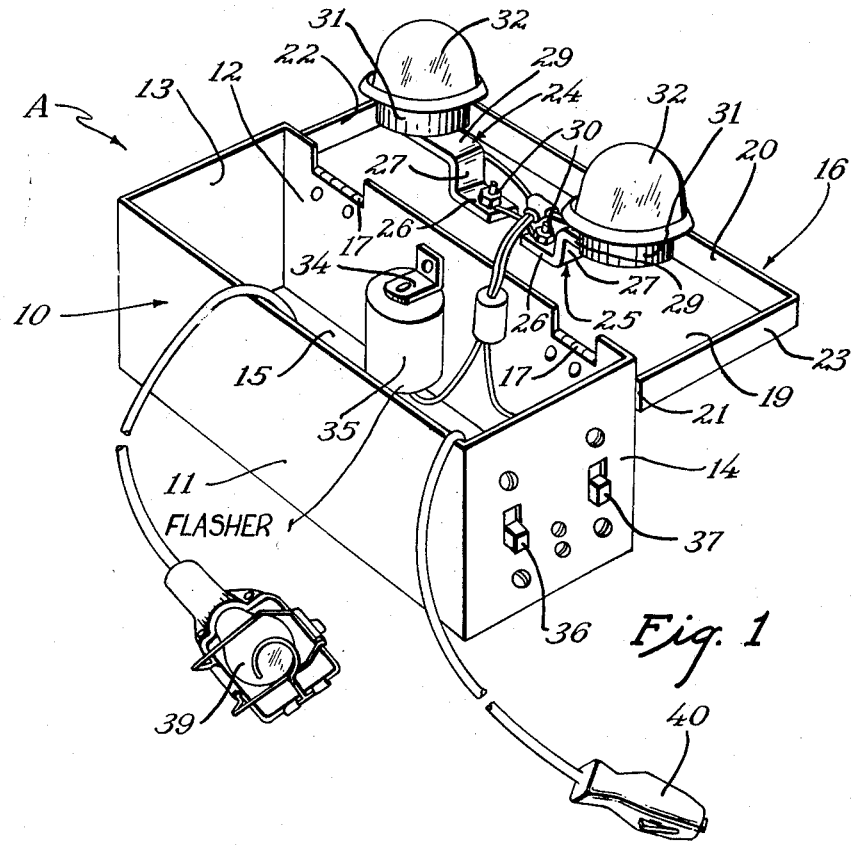
Figure 1 is a perspective view of the preferred form of construction showing the danger light and necessary elements mounted in a suitable enclosure.

The danger signal is preferably mounted in an enclosing casing, the entire apparatus being indicated by the letter A. The enclosing casing is indicated in general by the numeral 10 and includes a front wall panel 11, a parallel rear wall panel 12 and end wall panels 13 and 14. The side and end wall panels are connected by a suitable bottom panel 15.

Figure 2:
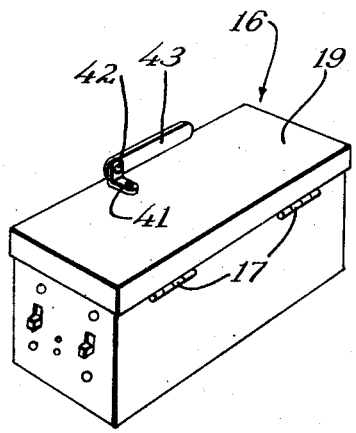
Figure 2 is a perspective view of the enclosing case in closed position.

A cover 16 is connected by hinges 17 to the rear wall panel 12. The hinges 17 are recessed downwardly from the upper edge of the panel 12 and are connected to the lower extremity of the cover 16. The cover includes a top panel 19, front and rear marginal depending flanges 20 and 21, and marginal depending end flanges 22 and 23. The side and end flanges are connected to provide an encircling skirt about the periphery of the top panel 19. This skirt telescopes onto the upper end of the bottom portion of the enclosure in closed position of the casing as illustrated in Figure 2.

A pair of brackets 24 and 25 are supported upon the top panel 19. These brackets are similarly formed and include a mounting flange 26, an off-set 27 and a bracket flange 29 parallel to the mounting flange 26. The mounting flanges 26 are connected to the cover panel by bolts 30 or other suitable means.

The warning lights are completely enclosed units and include a cup shaped base portion 31 attached to a corresponding bracket flange 29. The warning lights include a cup shaped transparent or translucent enclosure 32 removably attached to the base 31 and enclosing the light bulbs 33. Thus the light bulbs are completely enclosed and protected from the weather so that the signal may be used in any kind of weather.

An angle bracket 34 is supported upon the rear wall of the enclosure 12 midway between the ends thereof. This bracket 34 is designed to extend substantially between the brackets 24 and 25 so as not to interfere with the light bulb enclosures in folded condition of the enclosure. This bracket 34 supports a flasher 35 which changes the current from a steady current to an intermittent or pulsating current.

Switches 36 and 37 are supported on the end panel 14 for controlling the circuits. One switch 36 controls the circuit to the flasher 35, which in turn illuminates the light bulbs 33 and the other switch 37 controls a circuit which will be later described to a trouble light 39.

The current for illuminating the light bulbs 33 and the trouble light 39 is provided through a plug 40 which is of proper size for accommodation into the socket usually containing the cigarette lighter of the vehicle. Other types of connection with the vehicle battery may be obtained but the plug 40 is somewhat more convenient to use. An angle bracket 41 is connected to the outer surface of the top panel 19 of the cover 16 and this angle bracket 41 is pivotally connected at 42 to a leg 43. In closed condition of the device the leg 43 swings against the cover 19 as indicated in Figure 2. When the device is in use as in Figure 1 of the drawings, the leg 43 is swung at right angles to the cover panel 19 to provide a support for the cover.

Figure 3:
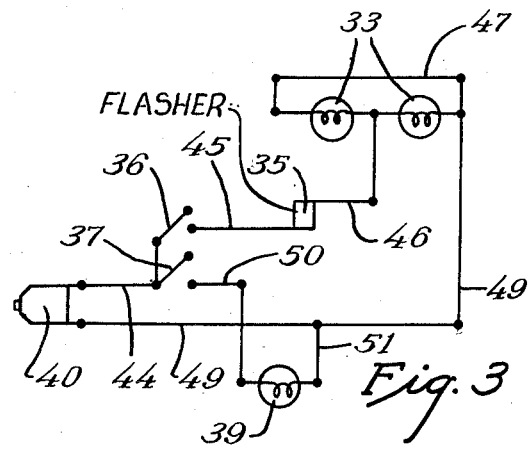
Figure 3 is a diagrammatic view of the wiring of the apparatus illustrated.

As indicated in Figure 3, the plug 40 which is connected to the vehicle battery through the cigarette lighter socket, is connected by conductor 44 to one terminal of each of the switches 36 and 37. The other terminal of switch 36 is connected by conductor 45 to one terminal of the flasher 35, the other terminal of which is connected by conductor 46 to one container of each of the light bulbs 33. The other contact of these light bulbs is connected by a common connection 47 to a conductor 49 which leads to the other terminal of socket 40, thus completing the circuit.

The circuit to the trouble light extends from conductor 44 through switch contact 37 to the conductor 50 leading to the trouble light. The other trouble light conductor 51 is connected to the conductor 49 leading to the socket 40 to complete the circuit.

Whe not in use the cover 16 is folded into the position shown in Figure 2 and all of the conductors leading to the socket 40 and to the trouble light 39, as well as these elements themselves, are contained within the enclosure 10. When the vehicle is forced to stop on the highway, the cover is swung open into the position shown in Figure 1 and the leg 43 is swung into right angular relation to the cover. The plug 40 is pulled from the container and is inserted into the receptacle on the vehicle dash board. By operating the switch 37 the lights 33 may be immediately set into operation to provide a flashing signal. Thus the vehicle operator may employ the flashing signal as a warning signal even when walking toward the rear of the vehicle to place the light into signalling operation.

In Figures 4 and 5 of the drawings, I disclose a modified form of signal indicated in general by the letter B. This signal includes an elongated standard 52 provided with a spike or pointed projection 53 at its lower end. The standard 52 is provided with a pair of similar brackets 53 and 54 arranged in opposed relationship. The brackets each include an anchoring portion 55, a right angular off-set 56 and a parallel portion 57 which extends parallel to the anchoring portion 55. The anchoring portion is fastened by screws, bolts, or other means 59 to the standard 52.

An angle bracket 60 is similarly attached to the standard 52 by a screw or bolt 61 and is attached to a flasher 63 so as to hold the flasher near the upper end of the standard 52. A right angular bracket 64 is also mounted upon the standard 52 at the upper end thereof. The angle bracket 64 includes an upright flange 65 attached to the upper end of the standard by screws, bolts, or other means 66 and includes a mounting flange 67 extending at right angles across the upper end of the standard.

The signal lights include a cup shaped lower portion 69 which is attached to the attaching flange 67 to project upwardly therefrom. The lights are also provided with an inverted cup-shaped translucent or transparent upper portion 70 in which a signal light is positioned. The signal light within the member 70 is connected by suitable electrical conductors to the flasher 63 and to a suitable source of power supply through the cable 71. When not in use the cable 71 is wound about the opposed brackets 53 and 54. The cable 71 is usually provided with a plug such as 40 engageable into the cigarette lighter socket on the dash board of the vehicle.

When this structure is to be used the cable is partially unwound from the brackets 54 and 55 and the light bulb within the light enclosure immediately starts into flashing operation. The device is then carried to the rear of the vehicle and stuck into the shoulder of the highway or into the highway itself to provide a flashing signal rearwardly of the vehicle.

In accordance with the patent statutes, I have described the principles of construction and operation of my danger light and while I have endeavored to set forth the best embodiment thereof, I desire to have it understood that obvious changes may be made within the scope of the following claims without departing from the spirit of my invention.

I claim:

1. A vehicle danger signal including a box-like enclosure having a bottom, completely opaque side walls extending upwardly therefrom, and a hinged cover hingedly secured to one of said side walls near the upper edge thereof, a pair of signal lights secured to the inner surface of said cover, said cover being swingable from a position in closing relation with said walls through substantially one hundred eighty degrees to an open position, said cover having encircling flanges, means supporting said lights above said flange and above said side walls when said cover is open, a flasher within said enclosure, and an elongated current supply cord secured to said lights and to said flasher and supported in said enclosure in closed position thereof.

2. The structure described in claim 1 and including a switch mounted on a wall of the enclosure and connected in series with said lights.

3. The structure described in claim 1 and including a leg on said cover extending downwardly therefrom in open position of the cover.

4. The structure described in claim 1 and including a leg pivotally secured to said cover to assist in supporting the same in open position of the cover.

5. The structure described in claim 1 and including a trouble light, and means connecting said trouble light to said current supply cord.

6. The structure described in claim 1 and including a trouble light having an elongated cord thereupon and designed for accommodation in said enclosure in closed position thereof, and a switch on said enclosure for controlling the circuit to said trouble light.

References Cited in the file of this patent
UNITED STATES PATENTS

| Number | Name | Date |
| --- | --- | --- |
| 702,819 | Parenteau | June 17, 1902 |
| 2,199,990 | Godfrey et al. | May 7, 1940 |
| 2,491,094 | Du Frane | Dec. 13, 1949 |
| 2,496,618 | Cox et al. | Feb. 7, 1950 |
| 2,517,119 | Le Duc | Aug. 1, 1950 |
| 2,528,490 | Berry | Nov. 7, 1950 |
| 2,597,705 | Clines | May 20, 1952 |